US011697602B2

(12) United States Patent
Smith

(10) Patent No.: US 11,697,602 B2
(45) Date of Patent: Jul. 11, 2023

(54) TECHNIQUES FOR MANAGING SCALE FORMATION IN WATER FILTRATION SYSTEMS AND A REVERSE OSMOSIS (RO) AND NANOFILTRATION (NF) SYSTEM IMPLEMENTING SAME

(71) Applicant: CrossTek Membrane Technology LLC, Billerica, MA (US)

(72) Inventor: Stanton Russell Smith, Waltham, MA (US)

(73) Assignee: CTX, LLC, Billerica, MA (US)

( * ) Notice: Subject to any disclaimer, the term of this patent is extended or adjusted under 35 U.S.C. 154(b) by 0 days.

(21) Appl. No.: 17/471,380

(22) Filed: Sep. 10, 2021

(65) Prior Publication Data

US 2022/0064021 A1    Mar. 3, 2022
US 2023/0140839 A9    May 4, 2023

Related U.S. Application Data

(63) Continuation of application No. 17/247,986, filed on Jan. 4, 2021, now Pat. No. 11,117,813, which is a
(Continued)

(51) Int. Cl.
*C02F 1/00*    (2023.01)
*C02F 1/44*    (2023.01)
(Continued)

(52) U.S. Cl.
CPC ............ *C02F 1/008* (2013.01); *B01D 61/025* (2013.01); *B01D 61/027* (2013.01); *B01D 61/12* (2013.01);
(Continued)

(58) Field of Classification Search
CPC .... B01D 61/02; B01D 61/025; B01D 61/027; B01D 61/12; B01D 65/02; B01D 65/08;
(Continued)

(56) References Cited

U.S. PATENT DOCUMENTS

2004/0134521 A1    7/2004    Liberman
2019/0224624 A1    7/2019    Kitamura et al.

FOREIGN PATENT DOCUMENTS

WO    WO-2007147198 A1 *    12/2007    ........... B01D 61/022

OTHER PUBLICATIONS

Delgrange, et al., "Modelling of ultrafiltration fouling by neural network," Desalination, 118:213-227 (Year: 1998).*
(Continued)

*Primary Examiner* — Patrick Orme
(74) *Attorney, Agent, or Firm* — Grossman, Tucker, Perreault & Pfleger, PLLC

(57) ABSTRACT

The present disclosure is directed to filtering technologies that combine elements of continuous and batch NF/RO based on the constraints of the end-user facility to achieve a target balance between, for instance, recovery and power consumption, and to reduce long term operating cost of a plant. A method for extending batch operation into a second induction period with antiscalant injection is also disclosed herein, with the second induction period allowing for yet higher water recovery.

16 Claims, 7 Drawing Sheets

Related U.S. Application Data continuation of application No. 15/733,581, filed as application No. PCT/US2020/034674 on May 27, 2020.

(60) Provisional application No. 62/991,393, filed on Mar. 18, 2020.

(51) Int. Cl.
*B01D 61/02* (2006.01)
*B01D 61/12* (2006.01)
*B01D 65/08* (2006.01)
*B01D 65/02* (2006.01)

(52) U.S. Cl.
CPC ............ *B01D 65/02* (2013.01); *B01D 65/08* (2013.01); *C02F 1/441* (2013.01); *C02F 1/442* (2013.01); *B01D 2311/14* (2013.01); *B01D 2313/18* (2013.01); *B01D 2313/243* (2013.01); *B01D 2321/02* (2013.01); *B01D 2321/16* (2013.01); *C02F 2201/005* (2013.01); *C02F 2209/03* (2013.01); *C02F 2303/16* (2013.01); *C02F 2303/22* (2013.01)

(58) Field of Classification Search
CPC ............ B01D 2311/14; B01D 2313/18; B01D 2313/243; B01D 2321/02; B01D 2321/16; C02F 1/008; C02F 1/441; C02F 1/442; C02F 2201/005; C02F 2303/16; C02F 2303/22; C02F 2209/03; C02F 9/00
See application file for complete search history.

(56) References Cited

OTHER PUBLICATIONS

Delgrange-Vincent, et al., "Neural networks for long term prediction of fouling and backwash efficiency in ultrafiltration for drinking water production," Desalination, 131:353-362 (Year: 2000).*
Cabassud, "Neural networks: a tool to improve UF plant productivity," Desalination, 145:223-231 (Year: 2002).*
UC Davis, Osmotic Pressure Definition (Year: 2023).*
International Search Report and Written Opinion dated Oct. 22, 2020, issued in PCT International Patent Application No. PCT/US2020/034674, 15 pages.
Restriction Requirement, dated Mar. 9, 2021, in related application U.S. Appl. No. 17/247,986, filed Jan. 1, 2021, 7 pages.
Office Action, dated Mar. 26, 2021, in related application U.S. Appl. No. 17/247,986, filed Jan. 1, 2021, 13 pages.

* cited by examiner

TECHNIQUES FOR MANAGING SCALE FORMATION IN WATER FILTRATION SYSTEMS AND A REVERSE OSMOSIS (RO) AND NANOFILTRATION (NF) SYSTEM IMPLEMENTING SAME

CROSS-REFERENCE TO RELATED APPLICATIONS

This application is a continuation of co-pending U.S. application Ser. No. 17/247,986 filed on Jan. 4, 2021, which is a continuation of co-pending U.S. application Ser. No. 15/733,581 filed on Sep. 3, 2020, which claimed the benefit of International Application No. PCT/US20/34674 filed on May 27, 2020 under 35 U.S.C. 120, which claimed the benefit of U.S. Provisional Patent Application Ser. No. 62/991,393, filed on Mar. 18, 2020, each of which is fully incorporated herein by reference.

TECHNICAL FIELD

This specification relates to filtration systems and managing scale formation within the same.

BACKGROUND INFORMATION

Water filtration systems often include at least one filter membrane for producing permeate from a feed stream. One approach to water filtration utilizes a steady-state continuous reverse osmosis (RO) operation/cycle and a pump that displaces feed through one or more filter membranes at a substantially constant pressure. The proportion of feed exiting as permeate relative to the portion of the feed exiting as retentate/reject establishes the recovery rate for the system. Such continuous flow systems typically operate at a recovery rate that is at or below a rate at which scaling conditions are induced. Consequently, continuous flow systems have a relatively low maximum recovery rate, e.g., 50-75%, to avoid formation of scale and fouling.

Another approach to water filtration utilizes a batch RO operation/cycle. In batch RO a pump varies pressure over time to overcome the osmotic pressure of one or more filter membrane(s). While batch RO systems enable a relatively higher rate of recovery relative to continuous flow systems, such systems must be periodically flushed to maintain permeate flux.

BRIEF DESCRIPTION OF THE DRAWINGS

Various aspects and features of the present disclosure will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

RO-based filtration systems continue to increase in popularity and adoption, particularly in commercial and large-scale filtering plants. RO-based water filtration systems fall into one of two modes of operation, namely continuous RO or batch RO. Although both modes of RO filter systems utilize similar filter technology, such as NF, Sea water RO and brackish water RO technology, filter systems that implement continuous RO operation versus those that implement batch RO operation fall at opposite ends of a continuum relative to each other.

Figure 1:
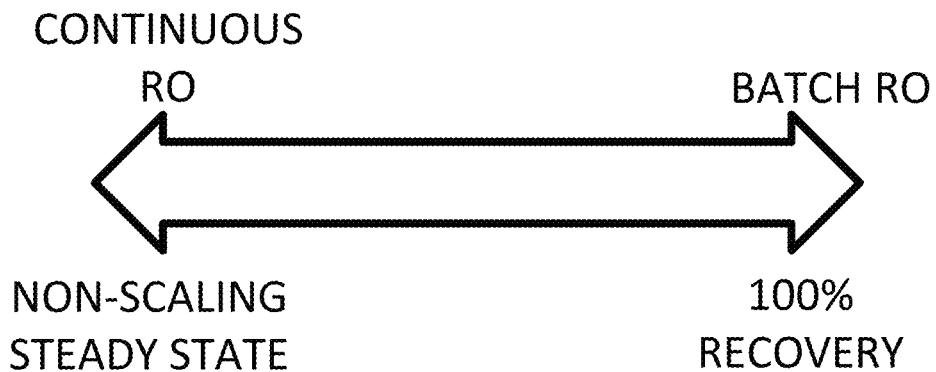
FIG. 1 shows an example diagram of a filtration system continuum having opposite extremes representing continuous RO and batch RO operations, respectively.

This continuum may better be understood by way of illustration. FIG. 1 shows one such example continuum having continuous RO and batch RO operations falling at opposite ends/extremes. In particular, continuous RO systems operate at relatively low recovery rate to achieve a non-scaling steady state (with or without antiscalant) with operational times being measured in weeks to months. On the other hand, batch RO systems operate at recovery rate that is above a non-scaling steady state, i.e., 100% recovery, with operational times being generally a fraction of the amount of time continuous RO systems operate before filter membranes get flushed, e.g., via feed. For instance, some batch RO operations occur for as little as a few minutes to several hours before a flush cycle occurs.

Continuous RO systems feature various structural and operational differences relative to batch RO systems. New and existing filter designs implement batch RO when high recovery is desired and continuous operation when stable, uninterrupted equipment operation is desired for weeks or months, no or low scale-inhibitor dose is preferred, and/or reduced water recovery is acceptable.

In either case, design of water filtration systems using NF and RO technology generally begins with determining a maximum recovery set point (also referred to herein as a water recovery rate, recovery rate or simply recovery) based on identifying the recovery rate at which scaling begins for the chosen filter membrane(s), with that identified recovery rate being generally calculated without the use of scale inhibitors, also referred to herein as antiscalant. Recovery rates for filter systems are expressed as a ratio defined by the portion of feed (or feed water) entering the filter system versus the portion of feed exiting as permeate. Recovery below 100%, therefore, includes at least a portion of the feed being output via one or a plurality of bleed valves as product retentate, which may also be referred to herein as reject water or simply reject.

Accordingly, product retentate, also referred to herein as retentate, refers to a portion of feed that does not pass through a filter membrane. On the other hand, permeate refers to the portion of the feed that passes through filter membrane(s) for output as, for instance, "clean" water, although permeate may not necessarily be potable water depending on the configuration of the filter system and the intended use of the permeate.

Note that the following disclosure refers generally to the point at which scaling reaches the point of supersaturation of the scale forming compounds, and when fouling reaches critical flux (or critical concentration) at which time permeate output is substantially reduced or otherwise prevented, as simply scaling and fouling, respectively. Some examples and scenarios discussed herein may refer to one or both of such scaling and fouling conditions in combination without necessarily referring to both. For example, various aspects and features disclosed herein reference a maximum non-scaling recovery rate. This value is not limited to only scaling, and can also refer to a maximum rate before fouling conditions are present.

Figure 2A:
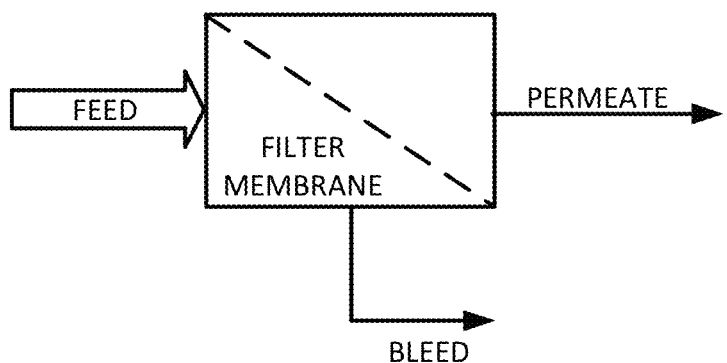
FIG. 2A shows a block diagram of an example filter configuration for use during continuous RO operations.

In the context of a continuous RO/NF system, such as shown in FIG. 2A, a maximum recovery rate (or set point) is established at a rate just below the identified recovery rate at which the onset of scaling conditions occur. Alternatively, and discussed in detail further below, the maximum recovery set point can operate above the identified recovery rate at which scaling conditions occur when utilizing antiscalant. In any event, the continuous RO/NF system then operates in a non-scaling steady state for a period generally measured in weeks/months. During operation, the continuous RO/NF system consumes a substantially constant amount of power, e.g., via loads such as pumps to displace the feed stream through the filter membrane, and the resulting product retentate is then disposed of via a sewer or provided to additional filtering stages, which further increases the operational costs of such systems. Continuous RO/NF systems often operate at a fixed recovery rate of about 50%-70% to maintain a non-scaling steady state.

Figure 2B:
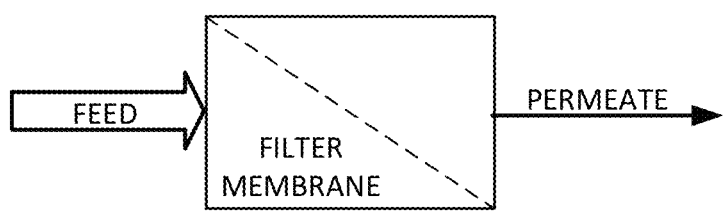
FIG. 2B shows a block diagram of an example filter configuration for use during batch RO operations.

Conversely, in the context of a batch RO/NF system, such as shown in FIG. 2B, a maximum recovery rate (or set point) are set above the identified recovery rate at which the onset of scaling conditions occurs. This configuration can achieve a cyclic batch operation where 100% of feed is converted to permeate for a period of time, after which the RO system is flushed with feed to eject the final batch concentrate of the run, and then restart the batch cycle.

For example, using batch RO/NF a maximum recovery rate of 100% may be set, eliminating the need for a bleed to output product retentate. The RO/NF system set at such a recovery rate then operates in a non-steady state and varies pressure over time to overcome the osmotic pressure of the filter membrane. The overall amount of time for such operation in a non-steady state may be measured in minutes or hours, depending on the particular configuration of the filter system. One advantage of batch RO is that a high recovery rate may be achieved without the use of antiscalants.

However, at a certain point during such batch operation the osmotic pressure of the filter membrane will exceed the maximum amount of pressure that the pump(s) of the system is capable of generating. System designers generally limit the amount of time when operating in such a non-steady state, which is to say operating beyond scaling limits, to avoid potential damage to filter systems and/or unsafe conditions. Such limits can include, for example, carefully monitoring system pressure and/or preventing operation in a non-steady state beyond a fixed predetermined amount of time. Thus, a high recovery rate, i.e., 100%, is achieved at the cost of down time (and reduced recovery rates) to flush the filter membrane, and the cost of added wear and tear on pumps introduced by high-frequency batch cycling.

Antiscalants have improved significantly over the last two decades, enabling higher recovery rates for both batch RO and continuous RO systems. Table 1 below demonstrates the ability of various commercially-available antiscalants to enable supersaturation % relative to 100% maximum without antiscalant, or maximum absolute concentration of major scaling compounds, or maximum Langelier saturation index (LSI) in pH units versus saturation pH for calcium carbonate scale in certain NF/RO reject streams. In Table 1, the maximum degree of supersaturation reported from one example public source is shown in the column 2, but it should be noted that results can change over time as antiscalant research progresses.

Commercial/large-scale NF/RO systems generally operate with a fixed feed rate and fixed recovery rate (which results in a fixed permeate and bleed rate) and such systems use antiscalant dosed into the feed to achieve a degree of supersaturation. Dosing of antiscalant generally occurs at or below 5 mg/l to reduce chemical costs. However, market demand for higher recovery rates continues to increase as well as reuse requirements in the wastewater market. Ever-increasing antiscalant doses remain a primary vehicle for meeting such demands. Simultaneously these same market demands result in higher membrane fouling rates and associated increased chemical costs.

A number of challenges associated with the handling of NF/RO bleed streams containing antiscalant also exist. Such challenges include the need to post-process such streams in a precipitation and thermal volume reduction system, and/or the impact of antiscalants on the receiving stream in the environment. Additional challenges include potential incompatibility between membranes and antiscalants and unexpected deleterious interaction between feed stream components and antiscalants, either or both of which can degrade filter system performance.

TABLE 1

| Scalant or Foulant | Maximum Reported by industry sources |
| --- | --- |
| LSI (calcium carbonate) | +2.9 |
| Calcium Sulfate | 400% |
| Strontium Sulfate | 1,200% |
| Barium Sulfate | 8,000% |
| Calcium Fluoride | 12,000% |
| Silica | 300 ppm or more |
| Iron | 5 ppm |
| Aluminum | 4 ppm |

Continued improvement in water filtration systems utilizing RO technology depends at least in part on development of filtering techniques that enable features and advantageous of continuous RO and batch RO systems to be integrated in a manner that achieves relatively high recovery rates, without the existing draw backs of such rates such as wear and tear on system components, high power consumption, and the necessity of antiscalant use.

Moreover, a need exists for filtration systems that can operate, in a general sense, at a mid-point of the continuum discussed above with regard to FIG. 1 to allow for balancing of a plurality of target parameters such as overall power consumption, waste water generation, and other costs to be factored into system design so that a desired water recovery rate is achieved that also comports with various other requirements and objectives specific to a particular filter system.

With the foregoing in mind, the present disclosure is directed to technologies (e.g., systems and methods) that combine elements of continuous and batch NF/RO. Such systems and methods may account for constraints of the end-user facility to achieve a target balance between, for instance, recovery and power consumption, and to reduce long term operating cost of a plant. Also disclosed herein are methods for extending the batch operation into a second induction period with antiscalant injection, with the second induction period allowing for yet higher water recovery. The first and/or second induction periods may preferably be extended through use of high-pressure filter membrane modules and pump(s) capable of generating variable pressures of up to 90-120 bar, for example, to displace feed water through the high-pressure filter membrane modules. Beyond scale, the technologies disclosed herein can also be used for fouling management as well, as foulants similarly have a negative impact on pressure and recovery of NF/RO systems.

The term "substantially" when used in reference to a stated quality, characteristic or value means±10% of the stated quality, characteristic, or value unless otherwise provided by the present disclosure.

The term "coupled" as used herein refers to any connection, coupling, link or the like and "fluidly coupled" refers to coupling such that fluid from one element is communicated to another element. Such "coupled" elements are not necessarily directly connected to one another and may be separated by intermediate components/elements. Likewise, the term "directly coupled" refers to a connection between elements without the use of an intermediate element, and "directly fluidly coupled" as used herein refers to a coupling of elements whereby fluid may be communicated from one element to another without the use of an intermediate component/element.

Figure 3:
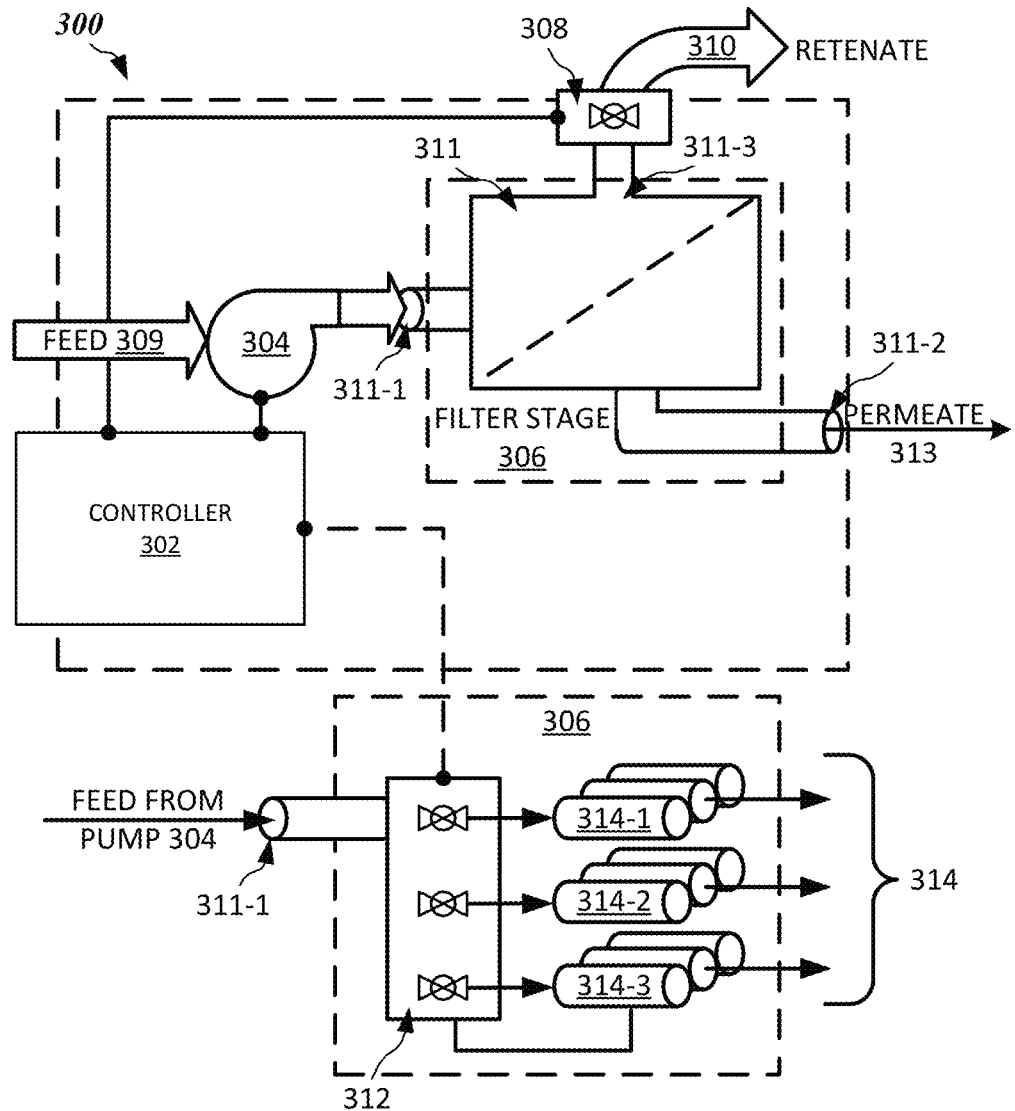
FIG. 3 shows a block diagram of an example filter system in accordance with embodiments of the present disclosure.

Turning to the Figures, FIG. 3 shows one example of a filter system 300 consistent with the present disclosure. As shown, the filter system 300 includes a controller 302, at least one pump 304, and a filter stage 306.

The controller 302 comprises at least one processing device/circuit such as, for example, a microcontroller (MCU), a digital signal processor (DSP), a field-programmable gate array (FPGA), Reduced Instruction Set Computer (RISC) processor, x86 instruction set processor, microcontroller, an application-specific integrated circuit (ASIC). Preferably, the controller 302 is implemented within a programmable logic controller (PLC). The controller 302 preferably communicatively couples to the at least one pump 304. The controller 302 can be configured to cause a driving signal to be provided to the pump 304 to cause the pump 304 to generate a target amount of pressure.

The controller 302 also preferably communicatively couples to at least one bleed valve, e.g., bleed valve 308. The controller 302 can be configured to cause a control signal to be provided to the bleed valve 308. Preferably, the control signal is configured to cause the bleed valve 308 to transition between a closed position and a plurality of open positions. Each of the plurality of open positions allow for a different amount of the feed water of the feed stream 309 to be output as product retentate 310 (also referred to herein as concentrate reject, reject water, or simply reject). As discussed further below, and in accordance with an embodiment, the filter valve arrangement 312 can switchably fluidly couple the feed displaced by the at least one pump 304 to one or more of the filter stages 314, which may also be referred to herein as filter arrays. The controller 302 may therefore be configured to cause a control signal to be provided to the valve arrangement 312, with the control signal to cause one or more of the filter stages 314 to be switchably fluidly coupled to the feed displaced via the at least one pump 304.

The bleed valve 308 may be implemented as an electromechanical valve configured to be actuated via a received control signal as discussed above. However, the bleed valve 308 may be implemented as any other suitable device including a manual valve that requires, for instance, a technician or engineer to actuate the valve via a user-supplied force. The filter stage 306 comprises at least one filter membrane 311. Preferably the at least one filter membrane 311 is a NF or RO filter membrane.

In an embodiment, the filter stage 306 comprises at least one high-pressure NF or RO filter membrane with a casing/housing capable of operating pressures of at least 1000-1800 psi, and preferably at least 1740±5 psi. In one non-limiting example, the at least one filter membrane 311 is implemented as a plate and frame (or spacer tube) high-pressure membrane module configured to withstand operating pressures up to 1750 psi. For example, the at least one filter membrane 311 may be implemented as an AquaZoom™ Ultra-High Pressure filter module having a pressure casing capable of 90-120 bar (1305-1745 psi) offered by CrossTek Membrane Technology LLC of Holbrook, Mass.

The at least one filter membrane 311 preferably includes at least one inlet 311-1 (or input) fluidly coupled to the feed stream 309 by way of the at least one pump 304. The at least one pump 304 may generate pressure (preferably, a variable amount of pressure) to cause feed water (also referred to herein as feed) of the feed stream 309 to be received and displaced into the at least one filter membrane 311. Note that while FIG. 3 depicts an example in which inlet 311-1 is directly coupled to pump 304, such a configuration is not required. For example, the at least one inlet 311-1 may be fluidly coupled to a bleed of another filter stage\filter system and be configured to receive reject output by the bleed as the feed stream 309. Alternatively, the at least one inlet 311-1 may be fluidly coupled to a permeate output of another filter stage/filter system and be configured to receive permeate output by the same as the feed stream 309.

The at least one filter membrane 311 further includes at least one outlet 311-2 to output permeate 313, and at least one bleed 311-3 to output retentate 310. The outlet 311-2 of the at least one filter membrane 311 may, for example, be fluidly coupled to an inlet of another filter stage of the plurality of filter stages 314 for further processing, depending on a desired configuration. The at least one bleed 311-3 may also be fluidly coupled to an inlet of another filter stage of the plurality of filter stages 314, or alternatively fluidly coupled to a sewer/wastewater return.

In an embodiment, the filter stage 306 is optionally implemented as a plurality of different filter stages, such as the filter stages collectively shown at 314 and individually as 314-1 to 314-2. Each of the plurality of filter stages 314 can further include substantially similar filter membranes or different types of filter membranes and/or overall number of filter membranes relative to other filter stages. For example, the first filter stage 314-1 may be configured with one or more filter membranes of a first type of filter membrane and the second filter stage 314-2 can be configured with one or more filter membranes of a second type, with the second type having pressure casing capable of withstanding a higher maximum operating pressure than the first type of filter membranes. This variation in filter types may be particularly advantageous when performing high pressure cycling via the second filter stage 314-2. In this scenario, the valve arrangement 312 can switchably fluidly couple the feed from the at least one pump 304 to the second filter stage 314-2, and switchably fluidly decouple the feed from other filter stages of the plurality of filter stages 314, such as the first filter stage 314-1, that may not necessarily have pressure casings capable of withstanding the particular pressure amounts of the high-pressure cycle.

The filter valve arrangement 312 can be implemented as an electromechanical valve configured to be actuated via a received control signal as discussed above. However, the filter valve arrangement 312 may be implemented via other suitable devices including manual valves that require, for instance, a technician or engineer to actuate the valve via a user-supplied force, or a combination of such manual and electromechanical valves.

Recovery of the filter system, which in an embodiment can be calculated as volume of permeate produced per volume of feed (or received feed water) consumed. For example, during a batch process recover may be calculated by Equation (1):

$$\frac{\text{batch feed rate} \times \text{batch time}}{(\text{batch feed rate} \times \text{batch time}) + (\text{feed flush rate} \times \text{flush time})} \quad \text{Equation (1)}$$

Consider the following scenario where the filter system flushes for 3 minutes at 125 gallons-per-minute (gpm) while running at 100 gpm during batch production for 30 minutes. The overall recovery of the filter system 300 may then be 88.9%=(100 gpm×30 min)/(100 gpm×30 min+125 gpm×3 min). One advantage of batch RO processes is that the filter system can operate without the use of antiscalants and exceed the maximum recovery without scaling by operating for a period of time shorter than the time it takes between the onset of scaling/fouling conditions and when the scaling occurs, with this period being referred to herein as a first induction period.

The designer then defines characteristics of the feed, e.g., feed 309, and preferably all scaling compounds and concentrations of the feed 309. In addition, and preferably, the effluent or permeate quality requirements of the end-user get defined, such as permeate conductivity, total dissolved solids (TDS, which can be calculated from conductivity), and organic content for example. Preferably, the effluent or permeate quality requirements are preferably based on conductivity as the same allows for an online rapid measurement and is a strong indicator of general permeate quality. The designer may also determine a feed flow rate, and end user desired recovery target(s). For the example discussed herein, the feed flow rate is 100 gpm, the feed total dissolved solids (TDS) is 2,000 ppm and the end user desires permeate TDS <250 mg/l.

The designer then performs membrane selection, and preferably, the scale and TDS rejection characteristics of the selected membrane gets defined. For example, a brackish water RO membrane may be selected and the TDS rejection of 99.5% can be employed for both TDS and scale rejection.

The designer then determines the water recovery at which scaling initiates, or when super-saturation of the scaling compounds of interest first occurs. This maximum non-scaling recovery is determined at, for example, the temperature and other pre-treatment dosing conditions (e.g. antiscalant dose, acid dose), expected to be implemented on the filter system. For example, the maximum non-scaling recovery may be set to 80% recovery, although the particular set point for the maximum non-scaling recovery rate may vary based on the above-discussed factors.

The designer then determines the first induction time, e.g., the time between when maximum non-scaling recovery is reached (or first exceeded) and when scaling actually occurs, based on, for instance, the temperature and other pre-treatment dosing conditions (e.g. antiscalant dose, acid dose) expected to be implemented on the filter system. For example, the first induction time may be equal to 25 minutes.

The designer then may optionally determine the hold-up volume of feed/reject in the filter system. For example, the filter system may be designed to have 200 gallons of feed/reject hold up.

The designer then preferably establishes a plurality of inputs (or operational parameters) including, for example, dynamic water/carrier fluid characteristics, scale, foulant, and TDS (total dissolved solids) to generate a mass balance that allows for tracking carried fluid (e.g., water and components) entering the system, and bleed and permeate leaving the system. Note, the bleed rate is preferably set as an input by the designer. This mass balance shows the progression of the concentration of then aforementioned parameters over time in the system and also preferably tracks recovery over time.

The designer may then analyze the outputs of the above mass balance and filter system performance based on varying the various inputs/parameters discussed above, and preferably selects operational parameters for the filter system that sets recovery between 100% recovery and maximum non-scaling recovery that achieves a desired power consumption rate (and by extension cost) and average recovery rate for the filter system. Preferably, the selected operational parameters also factor sewer/reject processing costs and/or peak power consumption (e.g., current peaks when cycling pumps of the filter system for flush, batch cycles, and so on). The designer may also update or otherwise modify the selected operational parameters to change operating set points as conditions change for the filter system, e.g., increase/decreased sewer processing costs, increased/decreased power costs, and/or increased/decreased recovery targets.

The selected operational parameters may then be preferably output as machine-readable instructions that, when executed by a controller such as controller 302, cause a sequence of filter operations to occur, such as one or more of the filter sequences shown in FIG. 4 and discussed in further detail below. Such instructions may be stored preferably within a memory (not shown) of the controller 302.

Extended Induction Periods for RO/NF Filter Systems

This disclosure has further recognized that, through the introduction of antiscalant at a predetermined moment prior to the end of the first induction period (e.g., when scaling/fouling occurs), a second induction period may then be established. This disclosure has further identified that overall recovery achieved by operation of the filter system 300 during the first and second induction periods allows for the same to achieve higher overall recovery rates relative to recovery enabled by the filter system 300 through use of antiscalant dosing alone during batch/continuous RO cycles. Such first and second induction periods may be factored into filter system design flows, such as the example filter system design flow discussed above.

Note, as discussed above the feed 309 into the filter stage 306 may be from the reject/retentate stream of another filter stage/system. In such cases, the feed 309 can include antiscalant. The concentration/amount of antiscalant present in the feed 309 along with the known efficiency of the antiscalant may then be utilized when determining dosing to cause the second induction period as disclosed herein. For example, antiscalant can have a time-dependent efficiency and may require more and/or less antiscalant dosages to cause the second induction period, and more importantly, the overall duration of time the second induction period extends.

In any event, the particular duration of the second induction period is based at least in part on the performance of the antiscalant being introduced, and optionally the antiscalant known to be present, at the predetermined moment. Thus, the second induction period may be predetermined at least in part based on the performance of a selected antiscalant (and/or based on the presence of antiscalant in feed 309). Preferably, the selected antiscalant enables the second induction period to extend for at least half the duration/period of time as the first induction period, and preferably, equal to or longer than the duration of the first induction period. Such extended second induction periods may therefore cause osmotic pressure to monotonically increase up to the rated osmotic pressure limitation of the at least one filter membrane 311. Thus, the filter system 300 may benefit if it implements the at least one filter membrane 311 as a high-pressure filter membrane module to allow for the second induction period to be extended up to periods of time that include associated osmotic pressures of 90-120 bar, for example.

In an embodiment, the filter system 300 implements features of both batch RO with recovery set between 100% recovery and non-scaling steady state for a portion of the cycle, with or without the use of antiscalant. Preferably, the filter system 300 implements at least one filter operation with a recovery rate set above the maximum non-scaling recovery rate and less than 100% recovery. This operation may be referred to herein as a substantially continuous operation as the recovery rate may be set to a rate above the maximum non-scaling recovery rate and have at least a portion of feed water output as reject. By way of contrast continuous operation includes recovery set to equal or less than a maximum non-scaling recovery rate, and batch operation includes recovery set to 100% (i.e. without bleeding reject). A filter system consistent with the present disclosure therefore allows for recovery above that of similar continuous system and below that of a similar batch RO system to achieve a balance of operational parameters such as overall power consumption and sewer costs.

In embodiment, batch RO and continuous operations/cycling may be executed in a predetermined sequence of filter operations that achieves various end-user requirements regarding, for instance, overall recovery (e.g., averaged over a predetermined amount of time), power consumption, and associated costs such as sewer/disposal costs to dispose of reject water, as discussed above.

It should be noted that the above-discussed first and second induction periods are preferably maximized to extend the overall amount of time a batch operation operates above a non-scaling steady state. However, other end-of-batch parameters such as concentration factor of the feed; feed quality e.g. total dissolved solids (TDS), conductivity; permeate quality (e.g. permeate conductivity); and/or feed-side pressure are also parameters that can trigger end of the filter process or otherwise can impact the overall duration of the first/second induction periods.

Additionally, it should be noted that the filter 300 system can use one or more energy recovery devices such as a turbocharger or pressure exchanger in combination with the various filtering processes disclosed hereinto further increase power efficiency and reduce overall power consumption.

In view of the foregoing, one aspect of the present disclosure is therefore to determine an optimal recovery and power consumption for RO and NF treatment recovery of scaling waters by sequencing batch and/or continuous RO operations. Various features and aspects of the present disclosure preferably allow for existing filter systems to be augmented/modified to enable greater control and tuning of power consumption and overall recovery rates, for example. However, the present disclosure is equally applicable to new filter system designs and is not necessarily limited in this regard.

Figure 4:
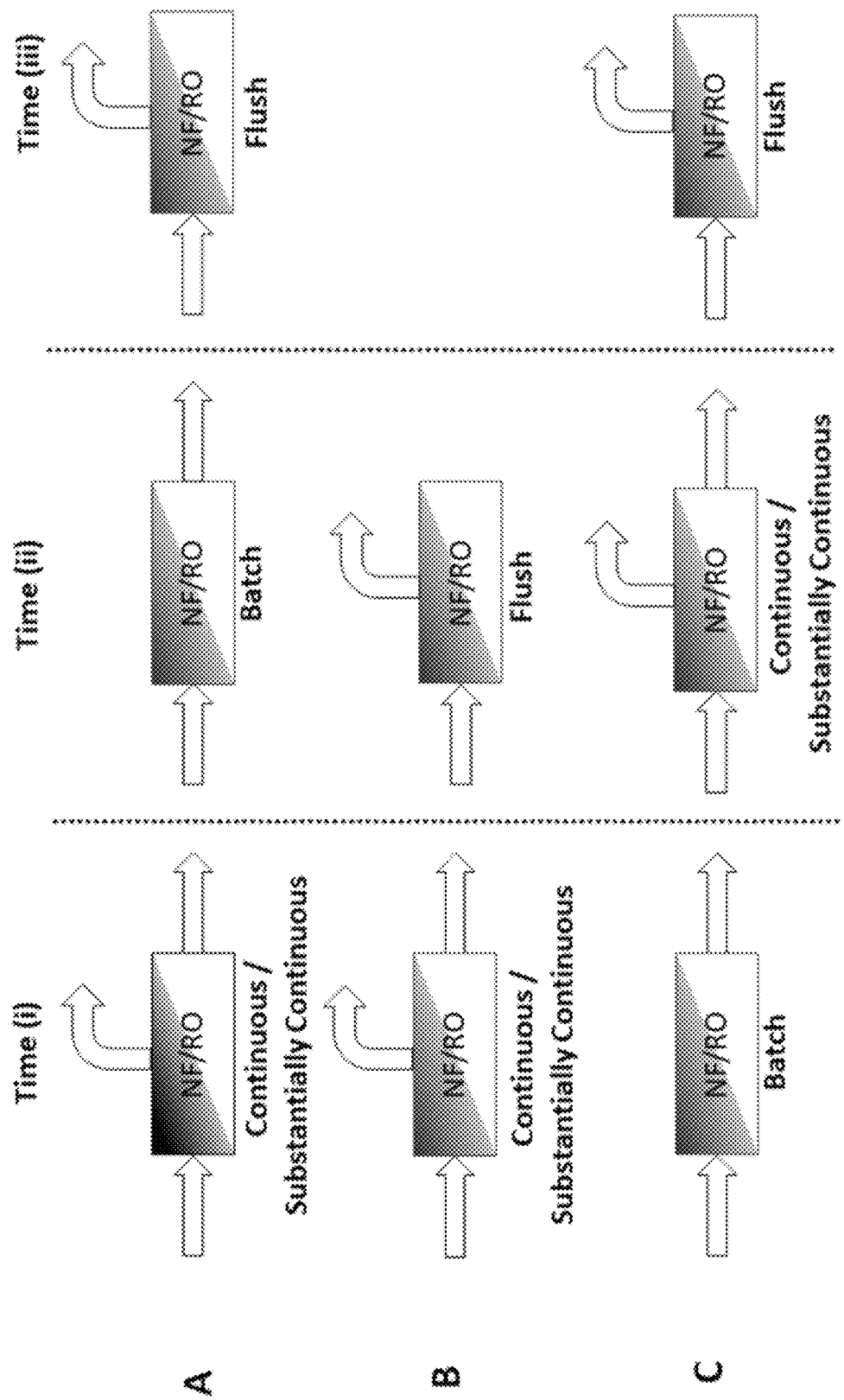
FIG. 4 shows a plurality of example filter operation sequences for execution by the filter system of FIG. 3, in accordance with embodiments of the present disclosure.

FIG. 4 demonstrates a plurality of example sequences (A-C), whereby operation of the filter system 300 of FIG. 3 can include operating in accordance with sequence A, B, C, or any combination thereof depending on, for example, a desired overall recovery rate, power consumption, and retentate/reject output. For example, operation can include sequences A and B without sequence C, or sequences A and C without sequence B.

During operation, each of the chosen sequences may include executing each of the stages shown at Time I, II and III, or only a subset of those stages. For example, sequences A and C may be optionally performed without necessarily executing a flush stage at Time III. Likewise, the sequences may be performed out of order, and sequence A may not necessarily be performed before B, and likewise, C may not necessarily be performed after B and instead may be performed after A, for example. Sequences may be repeated N number of times such that a given sequence repeats a predetermined number of times without other sequences being performed in between. Accordingly, the particular combination of sequences can include one or a plurality of selected sequences, with the selected sequences being executed in a desired order, and preferably, in an order that enables one or more performance targets to be achieved such as overall recovery rate and power consumption. The particular sequences may be preferably stored as machine-readable code (e.g., a settings file) in a memory (not shown) of the filter system 300 of FIG. 3.

It should be noted that sequence C allows the continuous stage to operate as an imperfect flush (also referred to herein as a partial flush) of the filter system 300 following the batch stage at time (I), therefore allowing for the overall number of operational cycles of the filter system 300 to be reduced relative to systems that perform a flush after each batch RO cycle. One example of this partial flush and shown and discussed below with reference to FIG. 8. Such partial flushes can advantageously increase operational lifespan of the filter system through reduced wear and tear on pumps and associated equipment, and reducing the periods of time that the filter system is not outputting permeate (e.g., recovery at 0%). This further advantageously provides a more stable operating condition for an end user, as well as yet greater power efficiency for the filter system by reducing energy losses caused by various filter system components such as, for instance, current spikes/surges caused by cycling the at least one pump 304. Such energy losses can significantly reduce power efficiency for a filter system as such losses accumulate over the lifetime of a system and ultimately can represent a significant source of power loss, particularly for high-current motors in commercial/large-scale filtration systems.

Figure 5:
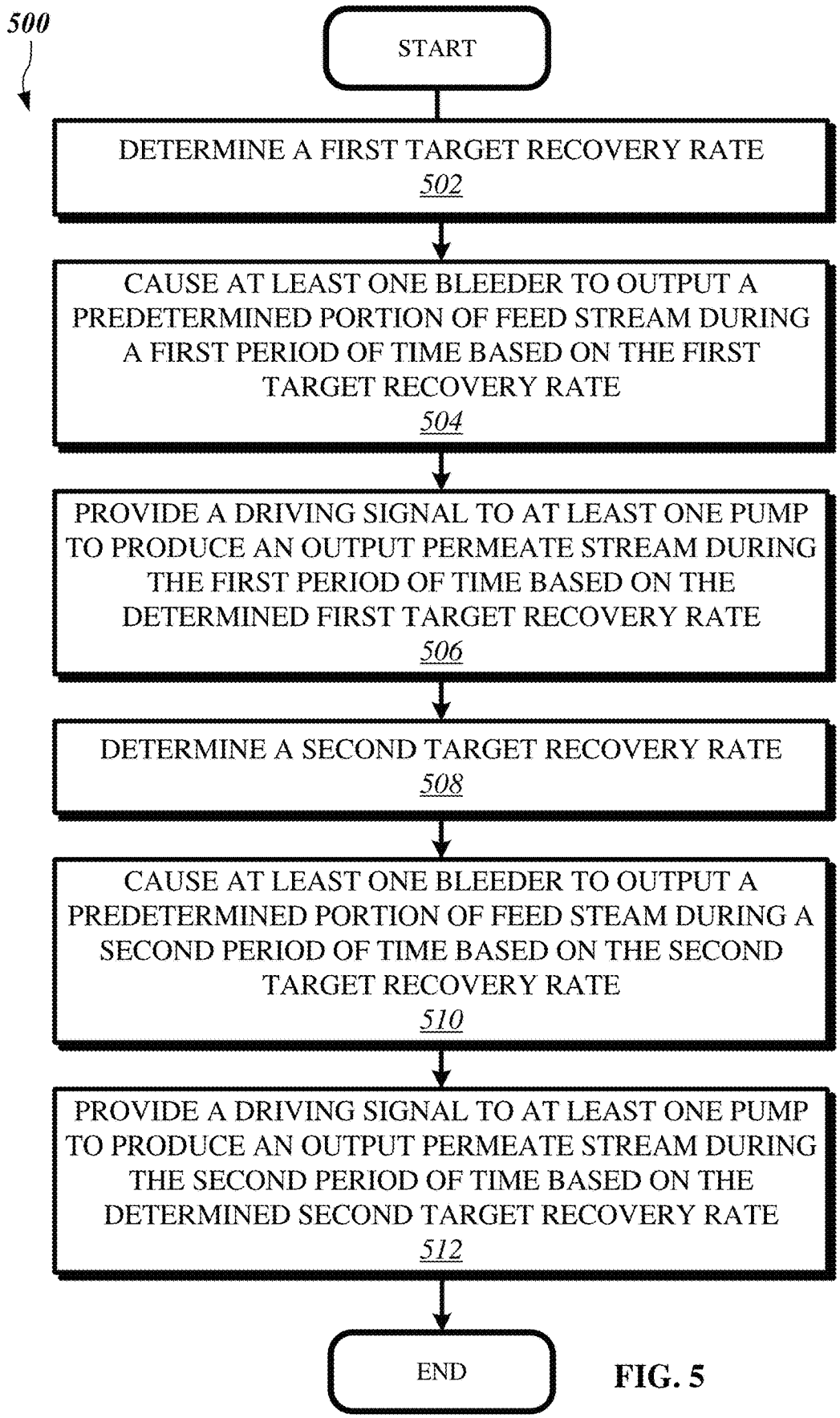
FIG. 5 shows an example process for performing one or more filter operation sequences of FIG. 4 in accordance with embodiments of the present disclosure.

FIG. 5 shows an example process 500 that exemplifies various aspects and features of the present disclosure. In particular, process 500 includes acts that cause a filter system consistent with the present disclosure to perform a continuous operation/cycle followed by a batch operation/cycle, e.g., such as is shown in the example sequence A of FIG. 4. However, process 500 is not necessarily limited in this regard and other sequences, and sequence combinations are within the scope of this disclosure.

Note, acts of the process 500 may not necessarily be performed in the order shown, and moreover, acts may be modified, omitted, and/or added in accordance with various aspects and features disclosed herein without departing form the scope of the present disclosure. Preferably, process 500 is performed at least in part by controller 302 in combination with one or more components of the filter system 300 to achieve automated operation, e.g., operation of the filter system 300 that does not necessarily require manual control and/or intervention by technicians to, for instance, open/close the at least one bleed valve 308 and cause the at least one pump 304 to generate a target pressure.

However, process 500 may also be performed through manual operation, e.g., actuation of the at least one bleed valve 308 and/or the filter valve arrangement 312 through a user manually actuating a switch to cause a control signal to the sent to the same, or through a combination of automated and manual steps. For example, the controller 302 may be configured to cause the at least one pump to generate a target pressure via an automated sequence, while the bleed valve 308 may be manually actuated by a technician to achieve a desired recovery rate. Notably, the controller 302 may be configured to provide a visual indicator, e.g., via a user interface of a computer system, LED light, etc., based on a timer/schedule to cause the technician to perform one or more manual steps/procedures such as actuating the at least one bleed valve 308.

Process 500 starts in act 502. In act 502, the controller 302 determines a first target recovery rate. Some non-limiting example recovery rates for the first target recovery rate include 25-50%, 50-70%, 50-80%, and all values and ranges therebetween. Preferably, the first target recovery rate is above a maximum non-scaling recovery rate for the filter system, e.g., at least an 80% recovery rate, and less than 100%. Additional non-limiting examples of the first target recovery rate include greater than a maximum non-scaling recovery rate for the at least one filter membrane and less than or equal to 98%. In any such cases, the remainder of feed water may then be output as reject. For example, and in the context of the first target recovery rate being greater than a maximum non-scaling recovery rate and less than or equal to 98, at least 2% of the feed water gets output as reject during the first period of time. However, the first target recovery rate may also be selected at or below the maximum non-scaling recovery rate for the filter system in scenarios where steady-state continuous operation for at least one cycle is desired.

In act 504, the controller 302 causes the at least one bleed 308 to output a predetermined portion of a feed stream, e.g., feed stream 309, as retentate/reject during a first period of time based on the first target recovery rate. For instance, and in an embodiment, an 80% recovery rate is set as the first target recovery rate and, therefore, the at least one bleed 308 may be configured to output 20% of the feed stream as retentate.

In act 506, the controller 302 causes a driving signal (or first driving signal) to be provided to at least one pump, e.g., pump 304, to cause the same to produce an output permeate stream during the first period of time based on the determined first target recovery rate. In an embodiment, the first driving signal is configured to cause the at least one pump to generate a substantially constant pressure such that over the first period of time pressure increases by a maximum of 10 psi per hour from an initial pressure that achieves the target recovery rate. In an embodiment, the first period of time is 1-2 hours, and preferably at least 6 hours. Note, the rate of pressure change during substantially continuous operation varies depending on multiple factors including, for example, feed water characteristics and/or the recovery set point. For example, a recovery rate of 99% during substantially continuous operation will result in a relatively higher per-minute pressure increase relative to operation at a recovery of 90%. Thus, the example pressure values and rates of change provided herein in connection with substantially continuous operation are not provided for purposes of limitation.

In act 508, the controller 302 determines a second target recovery rate. In an embodiment, the second target recovery rate is higher than the first target recovery rate. Some non-limiting examples of the second target recovery rate include a recovery rate between 70-80%, 80-100%, 90-100% and all values and ranges therebetween. In an embodiment, the second target recovery rate is between 95-100%, and preferably 100%. In another embodiment, the second target recovery rate is lower than the first target recovery rate, with the second target recovery rate to cause at least a partial flush of the at least one filter membrane. For example, the second target recovery rate may be set at or below a maximum non-scaling recovery rate for the at least one filter membrane 311, e.g., between 0-80%, and preferably above 0% to allow for permeate production to continue during the partial flush.

Alternatively, or in addition, the second target recovery rate is less than or equal to the maximum non-scaling recovery rate of the at least one filter membrane during a portion of the second period of time, and above the maximum non-scaling recovery rate during a portion of the second period of time.

In act 510, the controller 302 causes the at least one bleed 308 to output a predetermined portion of a feed stream, e.g., feed stream 309, as reject during a second period of time based on the second target recovery rate. In one example scenario, the second recovery rate is 100% and the predetermined portion of the feed stream 309 output as reject is therefore zero (0%), or substantially zero (0%) such that up to and including 2% of the feed stream 309 is output as reject. Accordingly, in this embodiment the controller 302 causes the at least one bleed 308 to close and to cause substantially no portion of the feed stream 309 to be output as reject during the second period of time.

Alternatively, the second target recovery rate is <100% and the predetermined portion of the feed stream 309 is therefore proportional to the particular target recovery rate. For example, the second target recovery rate may be set between 96-100% such that a ratio of the received feed water to output permeate stream by volume is between 0.96 and 1.0 during the second period of time. In another example, the second target recovery rate may be set between 0 to 80% as discussed above to cause at least a partial flush.

In act 512, the controller 302 causes a driving signal (or second driving signal) to be provided to the at least one pump to produce an output permeate stream during the second period of time based on the determined second target recovery rate. For example, the driving signal may be configured cause the at least one pump to monotonically increase pressure during the second period of time to exceed the osmotic pressure of the at least one filter membrane, e.g., the at least one filter membrane 311 of FIG. 3. Alternatively, the driving signal may be configured to cause a flush or partial flush as discussed above. In addition, the second driving signal may be configured substantially similar to the first driving signal discussed above, the description and features of which will not be repeated for brevity.

Preferably, the second driving signal is configured to cause the at least one pump to generate a substantially constant pressure such that over the second period of time pressure increases by at least 10 psi per minute, and preferably at least 50 psi per minute. In an embodiment, the second period of time is at least two (2) minutes.

As discussed in further detail below, act 512 can further include the controller 302 introducing antiscalant dose(s) at a predetermined moment to introduce a second induction period and extend the overall duration of the second period of time, and thus by extension, increase overall recovery (e.g., as averaged over time).

Figure 6:
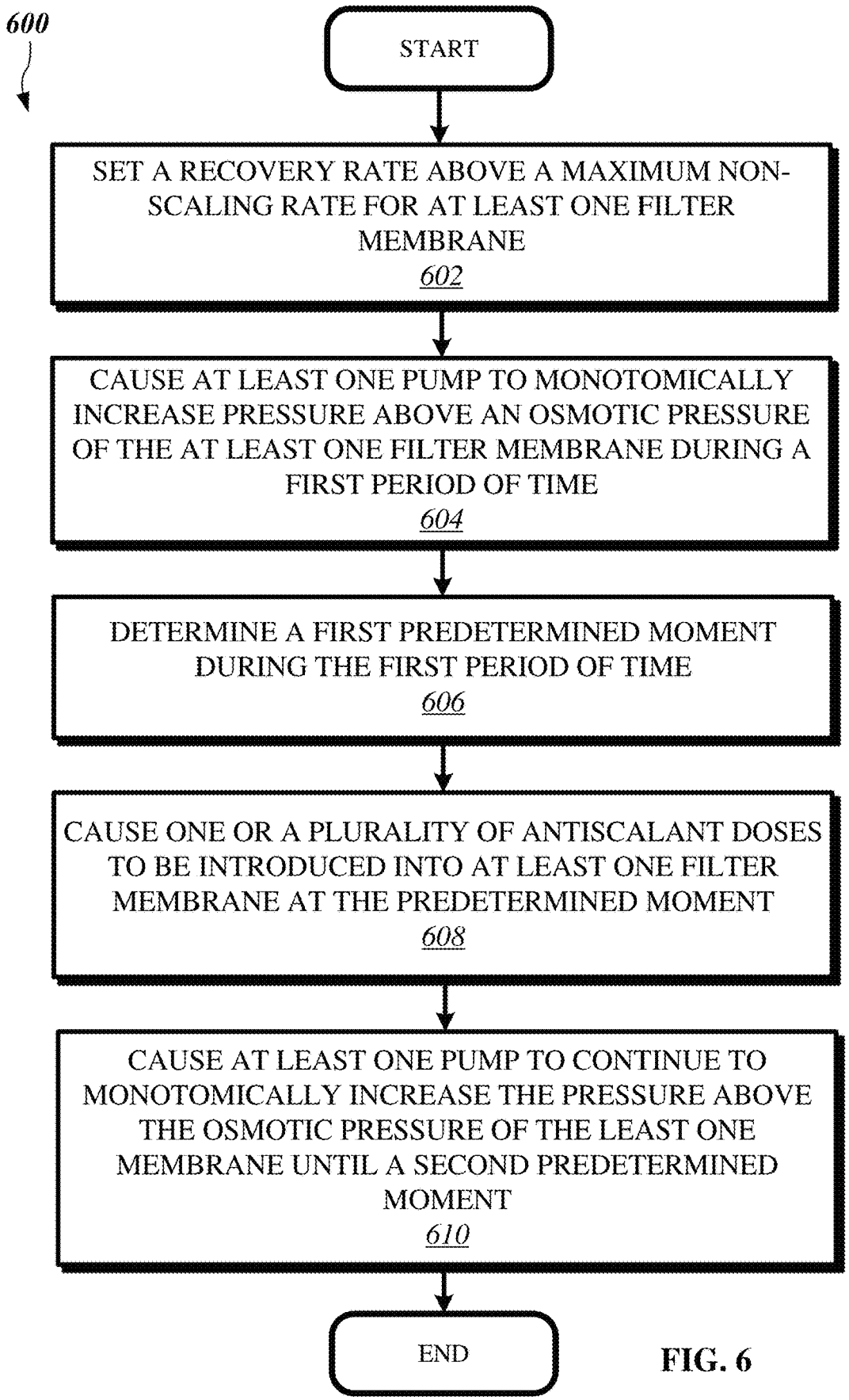
FIG. 6 shows an example process for generating first and second induction periods to extend operation of the filter system of FIG. 3 when operating at a recovery rate above a non-scaling rate in accordance with an embodiment.

FIG. 6 shows an example process 600 that exemplifies various aspects and features of the present disclosure. In particular, the process 600 includes acts that cause a filter system consistent with the present disclosure to extend batch RO cycling (e.g., having an associated recovery set above a maximum non-scaling recovery rate and below 100%, or preferably equal to 100% recovery) through introduction of a second induction period. Note, the process 600 may be performed by any filter system capable of batch RO processing, and is not necessarily limited to execution by the filter system 300 of FIG. 3 and/or filter systems with the aforementioned high-pressure filter membrane modules, for example. However, preferably the filter system implementing process 600 includes high-pressure filter membrane modules to allow for the second induction period to extend to moments in time where osmotic pressures for the associated filter membranes reaches 90-120 bar, and beyond.

Process 600 may be performed when providing the driving signals during, for instance, acts 506 and/or 512 of the process 500 of FIG. 5 discussed above. However, process 600 is not limited in this regard and process 600 may be performed by a filter system without necessarily performing acts of process 500. Note, acts of the process 600 may not necessarily be performed in the order shown, and moreover, acts may be modified, omitted, and/or added in accordance with various aspects and features disclosed herein without departing form the scope of the present disclosure.

In act 602, the controller 302 sets a recovery rate above a maximum non-scaling rate for at least one filter membrane, e.g., the at least one filter membrane 311. In an embodiment, the recovery rate is between 90 and 99.99%, and more preferably at 100%.

In act 604, the controller 302 causes the at least one pump to monotonically increase pressure above the osmotic pressure of the at least one filter membrane during a first period of time. In act 606, the controller 302 determines a first predetermined moment during the first period of time, the first predetermined moment being between the occurrence of scaling conditions and when scaling of the at least one filter membrane occurs. In an embodiment, the predetermined moment is at an initial start of the first period of time or at a moment following the initial start of the first period of time and prior to scaling and/or fouling of the least one filter membrane.

In at 608, the controller 302 causes one or a plurality of antiscalant doses to be introduced into at least one filter membrane at the predetermined moment. In act 610, the controller 302 causes the at least one pump to continue to monotonically increase the pressure above the osmotic pressure of the at least one membrane until a second predetermined moment. The second predetermined moment may be based on, for instance, a fixed amount of time and/or based on other conditions and factors to maintain filter system stability.

Figure 7:
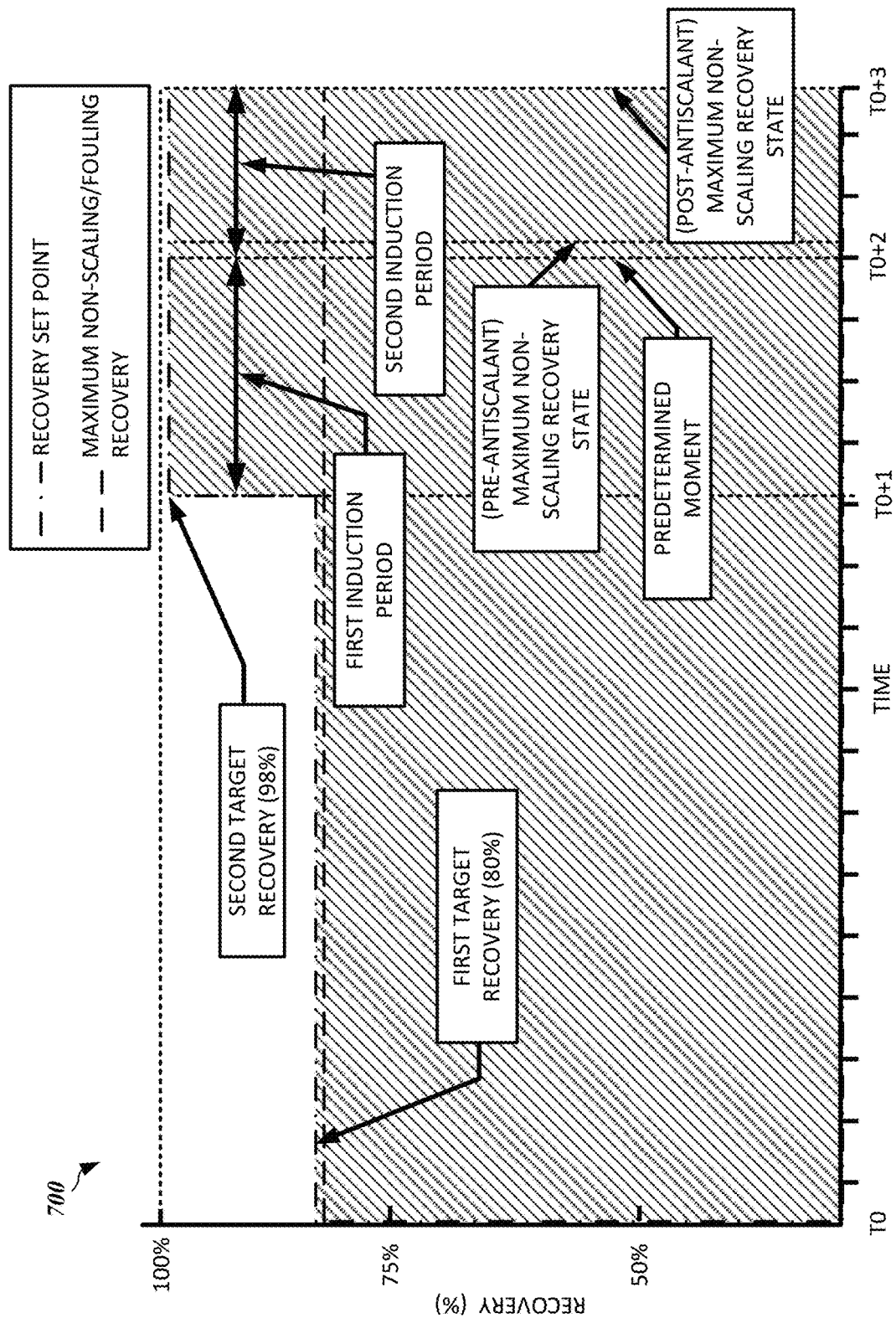
FIG. 7 is a graph illustrating various recovery target rates of the filter system of FIG. 3 over time (T) when executing one or more filter operation sequences in accordance with embodiments of the present disclosure.

FIG. 7 shows an example graph 700 that illustrates operation of the filter system 300 when executing the processes 500 and 600 of FIGS. 5 and 6, respectively. The graph 700 includes a range of target recovery from 0% to 100% along the Y axis, and time along the X axis. In this example sequence, the filter system 300 operates for a first period of time (T0 to T0+1) at a first target recovery, e.g., 80%, in accordance with acts 502-506 of the process 500 of FIG. 5. As shown, this first target recovery rate may preferably be selected as a rate that is above a predetermined maximum non-scaling/fouling recovery rate for the at least one filter membrane 311 of the filter system 300.

Following the end of the first period of time (e.g., T0+1), the filter system 300 operates for a second period of time (e.g., T0+1 to T0+2, or T0+1 to T0+3) at a second target recovery, e.g., 98%. The second period of time defines at least a first induction period, with the first induction period being the time between when the recovery rate of the filter system 300 exceeds the non-scaling/fouling recovery rate (e.g., the recovery rate at which the onset of scaling/fouling conditions occurs) and when the scaling/fouling occurs. Stated differently, during the second period of time the target recovery rate exceeds a maximum non-scaling recovery rate for the filter system 300 and has an associated duration of time prior to when a maximum non-scaling recovery state is reached for the one or more filter membrane(s) without antiscalant being intentionally injected, which may also be referred to as a pre-antiscalant maximum non-scaling recovery state. As shown, the filter system 300 reaches the pre-antiscalant maximum non-scaling recovery state just after T0+2 during the first induction period. Note, antiscalant may be present in the feed, as discussed above, and the term pre-antiscalant moment does not preclude the presence of such existing antiscalant.

As further shown, the filter system 300, and more particularly the controller 302, may determine a predetermined moment such as shown at T0+2 that is just prior to reaching the pre-antiscalant maximum non-scaling recovery state, e.g., when scaling/fouling occurs during the first induction period, e.g., based on act 606 of process 600 of FIG. 6.

At the predetermined moment, the controller 302 can cause antiscalant dose(s) to be introduced/injected into the at least one filter membrane 311, e.g., based on act 608 of process 600 of FIG. 6 discussed above. In response, operation of the filter system 300 at the second target recovery rate may then continue during the second induction period until, for example, osmotic pressure of the at least one filter membrane 311 exceeds the maximum pressure of the at least one pump 304, or until a predetermined maximum amount of time for the operation of the filter system 300 during the second induction period elapses to avoid operating the filter system 300 in unstable conditions.

For example, introducing antiscalant at the predetermined moment therefore extends the maximum non-scaling recovery state for the filter system 300 until T0+3, with this shifted/extended recovery state also being referred to as a post-antiscalant maximum non-scaling recovery state. This extended duration of time may be such that the osmotic pressure of the at least one filter membrane exceeds the maximum amount of pressure capable of generation by the at least one pump 304 and/or the maximum pressure rating for filter membranes before reaching the end of the second induction period (e.g., T0+3), for example. Thus, the filter system 300 may be preferably configured to continue batch operation at the second target recovery rate for a predetermined maximum amount of time during the second induction period, with the predetermined maximum amount of time being less than the overall duration of the second induction period provided by the introduction of antiscalant dose(s) at the predetermined moment. The predetermined maximum amount of time may be selected as a constant duration, e.g., 1 minute, 3 minutes, 1-30 minutes, or may be dynamically set based on, for instance, dosage amounts of the antiscalant, and/or known antiscalant performance ratings, and/or known feed conditions, pressure or other equipment limitations, and/or permeate or reject quality requirements which may be measured online via, for instance, an Internet of Things (IOT) device.

In any such cases, the predetermined moment therefore delineates the first induction period from the second induction period as shown in FIG. 7. Note, the first and second induction periods may be substantially equal in duration or may be different. Preferably, the second induction period is at least half the duration of the first induction period.

Figure 8:
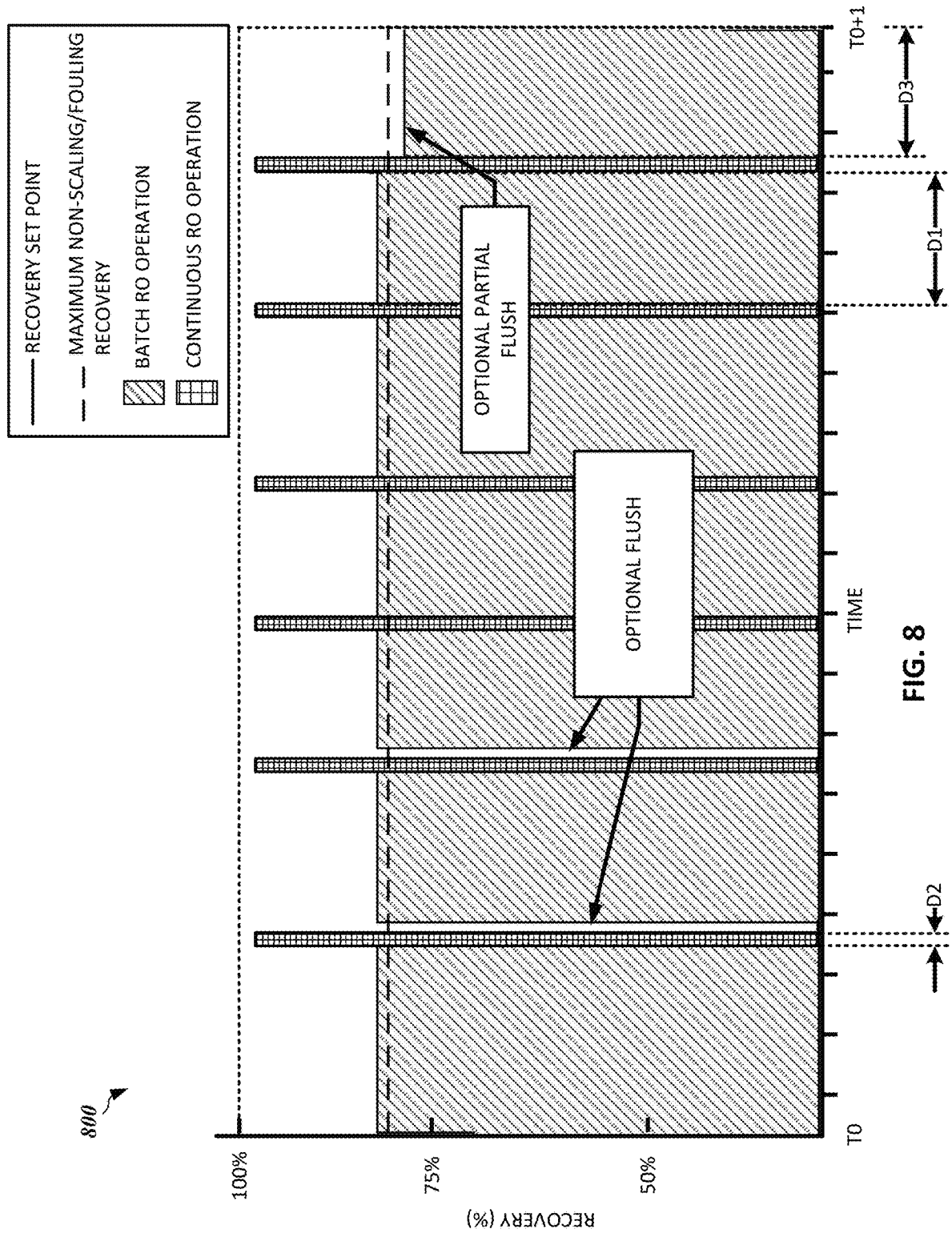
FIG. 8 is another graph illustrating various recovery target rates of the filter system of FIG. 3 over time (T) when executing one or more filter operation sequences in accordance with embodiments of the present disclosure.

FIG. 8 shows an example graph 800 that illustrates operation of the filter system 300 when executing process 500 of FIG. 5 in accordance with an embodiment. The graph 800 includes target recovery from 0% to 100% along the Y axis, and time along the X axis. In this example scenario, the filter system 300 operates in a sequence that includes substantially continuous operation at a first recovery target (above a maximum non-scaling recovery rate and below 100% recovery), and a batch operation at a second recovery target (100% recovery). The sequence further includes optional flush cycles, as will be discussed below.

As shown, the overall duration of each substantially continuous operation is D1, and the overall duration of each batch operation is D2. D1 can measure at least 6 hours, and preferably, D1 measures at least one day. On the other hand, D2 can measure at least a minute to several hours, and preferably at least 5 minutes. D1 may therefore be substantially longer in duration relative to D2.

The duration of each substantially continuous operation, D1, may be uniform or may vary such that each operation is longer, substantially equal to, or shorter than the other substantially continuous operations. Likewise, the duration of each batch operation, D2, may be uniform or may vary such that each operation is longer, substantially equal to, or shorter than the other batch operations. As discussed above, antiscalant may be introduced at a predetermined moment to introduce/induce the second induction period. Therefore, one or a plurality of the batch operations may include a duration, D2, which is longer than other batch operations that do not include the use of antiscalant to achieve a second induction period.

As further shown, the filter system 300 may operate at a recovery rate of 0% to cause optional (full) flushes of the at least one filter membrane 311 such that all of the received feed water is output as reject. The optional flush may be caused by, for instance, a second driving signal as discussed above with regard to process 500 of FIG. 5. However, the optional flush may also be caused by a third driving signal. Preferably, the third driving signal is configured to cause a third target recovery rate, e.g., 0% in the case of a full flush, or greater than zero (0%) and less than or equal to the maximum non-scaling recovery rate (e.g., 80%) during a partial flush. In an embodiment, the third target recovery rate may be different than both the first and second target recovery rates as discussed above with regard to process 500 of FIG. 5.

For example, and as shown, the filter system 300 may operate at a recovery rate below that of the maximum non-scaling/fouling recovery rate, e.g., between 1-80% and preferably 80%, during a third period (or duration) D3 based on the third driving signal. The duration D3 is designed to cause at least a partial flush of the at least one filter membrane 311 without the necessity of a full flush (e.g., 0% recovery for a period of time). Thus, the filter system 300 may continue to produce permeate stream without intervening full flushes, which is to say without necessarily dropping to 0% recovery to flush after batch RO operation, for instance.

Aspects of this disclosure thus enable the NF/RO designer to select an optimal operating approach that combines select elements of continuous and batch NF/RO based on the constraints of the end-user facility, and to reduce long term operating cost of a plant. A method for extending the batch operation into a second induction period with antiscalant injection is also disclosed herein, with the second induction period allowing for yet higher water recovery. Additionally, beyond scale, the techniques and features disclosed herein can be used for fouling management as well, as foulants similarly have a negative impact on pressure and recovery of NF/RO systems.

Additional Example Aspects and Architecture

One aspect of the present disclosure includes a method to determine the recovery and power conditions/parameters (referred to herein as also operating parameters) that allow an NF/RO system to operate at a set point that, in a general sense, falls along a continuum between the two extremes of non-scaling steady state operation (with or without antiscalant) provided by continuous systems and 100% recovery batch operations provided by RO systems. The following disclosure therefore provides the follow non-limiting examples.

Example 1 includes operating a NF/RO system with at least one feed stream, one bleed stream and one permeate stream, with the recovery set between the extremes of 100% recovery and maximum non-scaling or non-fouling recovery for at least part of the operating cycle.

Example 2 includes operating a NF/RO system with at least one feed stream, one bleed stream and one permeate stream, with the recovery set between the extremes of 100% recovery and maximum non-scaling or non-fouling recovery for at least part of the operating cycle, with a feed flush sequence as the final step of the operating cycle, prior to repeating the operating cycle. (See e.g., Sequence B in FIG. 4)

Example 3 includes a method of operating a NF/RO system with at least one feed stream, one bleed stream and one permeate stream, with the recovery set between the extremes of 100% recovery and maximum non-scaling or non-fouling recovery for one part of the operating cycle, and with 100% recovery for another part of the operating cycle (See e.g., Sequences A and C of FIG. 4, without necessarily requiring flush cycles).

Example 4 is a method of operating a NF/RO system with at least one feed stream, one bleed stream and one permeate stream, with the recovery set between the extremes of 100% recovery and maximum non-scaling or non-fouling recovery for one part of the operating cycle, and with 100% recovery for another part of the operating cycle, with a feed flush sequence as the final step of the operating cycle, prior to repeating the operating cycle. (See e.g., Sequences A and C of FIG. 4).

Example 5 is a method of operating a NF/RO system with at least one feed stream, one bleed stream and one permeate stream, with the recovery set between the extremes of 100% recovery and maximum non-scaling or non-fouling recovery for at least part of the operating cycle, operating initially without antiscalant during a first induction period until a predetermined moment that is just prior to when scaling/fouling occurs, then adding dose(s) of antiscalant into the feed, to enable extended operation (e.g., a second induction period) just prior to completing with a feed flush sequence as the final step of the operating cycle, prior to repeating the operating cycle one or more times.

Example 6 is a method of operating a NF/RO system with at least one feed stream, one bleed stream and one permeate stream, with the recovery set between the extremes of 100% recovery and maximum non-scaling or non-fouling recovery for one part of the operating cycle, and with 100% recovery for another part of the operating cycle, operating initially during a first induction period without antiscalant until just prior to arriving at antiscalant-free induction period (or second induction period), then adding a dose of antiscalant into the feed, to enable extended operation (e.g., the second induction period) up to the antiscalant-induction period just prior to completing with a feed flush sequence as the final step of the operating cycle, prior to repeating the operating cycle.

Example 7 is a method of operating a NF/RO system with at least one feed stream and one permeate stream, with 100% recovery, operating initially during a first induction period without antiscalant until just prior to arriving at antiscalant-free induction period (second induction period), then adding a dose of antiscalant into the feed, to enable extended operation (the second induction period) just prior to completing with a feed flush sequence as the final step of the operating cycle, prior to repeating the operating cycle.

Example 8 is a method of operating a NF/RO system with at least one feed stream and one permeate stream, with 100% recovery, operating with antiscalant to enable concentrating beyond antiscalant-free induction period, up to just ahead of the antiscalant-induction period, prior to completing with a feed flush sequence as the final step of the operating cycle, prior to repeating the operating cycle.

Example 9 is a method of operating an NF/RO system with plate and frame or spacer tube high pressure membrane module with at least one feed stream and one permeate stream, with 100% recovery, operating initially without antiscalant until just prior to arriving at antiscalant-free induction period, then adding a dose of antiscalant into the feed, to enable extended operation (a second induction period) up to the antiscalant-induction period just prior to completing with a feed flush sequence as the final step of the operating cycle, prior to repeating the operating cycle.

Example 10 is a method of operating a NF/RO system with plate and frame or spacer tube high pressure membrane module with at least one feed stream and one permeate stream, with 100% recovery, operating with antiscalant to enable concentrating beyond antiscalant-free induction period, up to just ahead of the antiscalant-induction period, prior to completing with a feed flush sequence as the final step of the operating cycle, prior to repeating the operating cycle.

Example 11 is a method of operating a filtration system, the filtration system having at least one inlet fluidly coupled to at least one feed stream, at least one filter membrane fluidly coupled to the at least one inlet to receive feed water from the at least one feed stream, and at least one pump to generate a pressure to displace the feed water from the at least one feed stream into the at least one filter membrane and produce an output permeate stream, the method comprising causing a first driving signal to be provided to the at least one pump to cause the generated pressure to produce the output permeate stream at a recovery rate that is substantially equal to a first target recovery rate during a first period of time, the first target recovery rate being greater than a maximum non-scaling recovery rate for the at least one filter membrane and less than 100%.

Example 12 includes the features of example 11, and further comprises causing a second driving signal to be provided to the at least one pump to cause the generated pressure to produce the output permeate stream at a recovery rate substantially equal to a second target recovery rate during a second period of time.

Example 13 includes the features of example 12, and wherein the second target recovery rate is equal to or less than a maximum non-scaling recovery rate for the at least one filter membrane.

Example 14 includes the features of example 12, and wherein the second target recovery rate is greater than the maximum non-scaling recovery rate for the at least one filter membrane.

Example 15 includes the features of example 12, and wherein the second target recovery rate is greater than the maximum non-scaling recovery rate for the at least one filter membrane and the first target recovery rate.

Example 16 includes the features example 12, and wherein the second driving signal is configured to cause at least a partial flush of the at least one filter membrane such that the second target recovery rate is less than the maximum non-scaling recovery rate for the at least one filter membrane.

Example 17 includes the features of example 16, and wherein the second target recovery rate is equal to zero such that all of the received feed water of the at least one feed stream is output as reject.

Example 18 includes the features of example 12, wherein the second target recovery rate is less than or equal to the maximum non-scaling recovery rate for the at least one filter membrane during a portion of the second period of time, and above the maximum non-scaling recovery rate during a portion of the second period of time.

Example 19 includes the features of example 12, and wherein the second target recovery rate is greater than 0% and less than or equal to the maximum non-scaling recovery rate to cause a partial flush of the at least one filter membrane.

Example 20 includes the features of example 12, and wherein the second target recovery rate is between 96-100% such that a ratio of the received feed water to output permeate stream by volume is between 0.96 and 1.0 during the second period of time.

Example 21 includes the features of example 12, and further comprises causing at least one bleed valve fluidly coupled to the at least one filter membrane to output a first predetermined portion of the feed water of the at least one feed stream as reject water during the second period of time.

Example 22 includes the features of Example 21, and wherein the second target recovery rate is equal to 100%, and wherein causing the at least one bleed valve to output the first predetermined portion of the at least one feed stream as reject water during the second period of time further comprises closing the at least one bleed valve such that substantially 0% of the at least one feed stream is output as reject water.

Example 23 includes the features of Example 21, and wherein the second target recovery rate is less than 100%, and wherein causing the at least one bleed valve to output the first predetermined portion of the at least one feed stream as reject water during the second period of time further comprises opening the at least one bleed valve to output the first predetermined portion of the feed water as reject water.

Example 24 includes the features of Example 12, and wherein the second target recovery rate is 100% such that 0% of the at least one feed stream is output as reject water during at least a portion of the second period of time.

Example 25 includes the features of Example 12, wherein the second period of time occurs prior to or after the first period of time based on a predetermined sequence of filter operations.

Example 26 includes the features of Example 12, wherein the second target recovery rate is 100%, and causing the second driving signal to be provided to the at least one pump further comprises causing one or a plurality of antiscalant doses to be introduced into the at least one filter membrane at a predetermined moment during the second period of time, and wherein the predetermined moment delineates the second period of time into a first induction period occurring prior to the predetermined moment and a second induction period occurring after the predetermined moment at which antiscalant is introduced, the first induction period being a period of time operating before scaling and/or fouling of the at least one filter membrane occurs, the second induction period being a period of time measured from when the antiscalant is introduced to when scaling and/or fouling of the at least one filter membrane occurs.

Example 27 includes the features of any one of Examples 11-26, and further comprises causing a third driving signal to be provided to the at least one pump to at least partially flush the at least one filter membrane, wherein causing third driving signal to be provided to the at least one pump to at least partially flush the at least one filter membrane further comprises causing the third driving signal to be provided to the at least one pump during a third period of time, the third period of time subsequent to the second period of time.

Example 28 includes the features of Example 27, and wherein the third driving signal is configured to cause the at least one pump to generate a pressure to produce the output permeate stream at a recovery rate that is substantially equal to a third target recovery rate during the third period of time.

Example 29 includes the features of Example 28, and wherein the third target recovery rate is between 0% and 80% during the third period of time to cause at least a partial flush of the at least one filter membrane.

Example 30 includes the features of Example 28, and wherein the third target recovery rate is substantially 0% to cause a full flush of the at least one filter membrane, the third target recovery rate being different than the first target recovery rate and the second target recovery rate.

Example 31 includes the features of any one of Examples 11-30, wherein the second period of time is subsequent to the first period of time, and wherein causing the second driving signal to be provided during the second period of time occurs without causing an intervening full flush of the at least one filter membrane between the first and second periods of time.

Example 32 includes the features of Example 12, wherein the second driving signal is configured to cause pressure generated by the at least one pump to increase to an amount exceeding osmotic pressure of the at least one filter membrane such that over the second period of time pressure increases by at least 10 psi per minute, the second period of time being at least two (2) minutes.

Example 33 includes the features of Example 12, wherein the second driving signal is configured to cause the at least one pump to generate a substantially constant pressure such that over the second period of time the substantially constant pressure increases by a maximum of 10 pounds per square inch (psi) per hour, the second period of time being at least 6 hours.

Example 34 includes the features of any one of Examples 11-33, wherein the first driving signal is configured to cause pressure generated by the at least one pump to increase to an amount exceeding osmotic pressure of the at least one filter membrane such that over the first period of time pressure increases by at least 10 psi per minute, the first period of time being at least two (2) minutes.

Example 35 includes the features of any one of Examples 11-33, wherein the first driving signal is configured to cause the at least one pump to generate a substantially constant pressure such that over the first period of time the substantially constant pressure increases by a maximum of 10 pounds per square inch (psi) per hour, the first period of time being at least 6 hours.

Example 36 includes the features of any one of Examples 11-35, further comprising causing at least one bleed valve fluidly coupled to the at least one filter membrane to output a second predetermined portion of feed water of the at least one feed stream as reject water during the first period of time.

Example 37 includes the features of Example 36, wherein the first target recovery rate is less than or equal to 98%, and wherein causing the at least one bleed valve to output the second predetermined portion of feed water of the at least one feed stream as reject water during the first period of time further comprises opening the at least one bleed valve to cause at least 2% of the feed water of the at least one feed stream to be output as reject water during the first period of time.

Example 38 includes the features of any one of Examples 11-37, wherein causing the first driving signal to be provided to the at least one pump further comprises causing one or a plurality of antiscalant doses to be introduced into the at least one filter membrane at a predetermined moment during the first period of time, the predetermined moment at an initial start of the first period of time or at a moment following the initial start of the first period of time and prior to scaling and/or fouling of the least one filter membrane.

Examples 39 includes the features of Example 38, wherein the predetermined moment delineates the first period of time into a first induction period occurring prior to the predetermined moment and a second induction period occurring after the predetermined moment at which antiscalant is introduced, the first induction period being a period of time operating before scaling and/or fouling of the at least one filter membrane occurs, the second induction period being a period of time measured from when the antiscalant is introduced to when scaling and/or fouling of the at least one filter membrane occurs.

Example 40 includes the features of Example 39, wherein causing the first driving signal to be provided to the at least one pump further comprises causing the at least one pump to monotonically increase pressure beyond osmotic pressure of the at least one filter membrane from the predetermined moment the antiscalant is introduced to maintain the first target recovery rate during at least a portion of the second induction period.

Example 41 is a filter system comprising at least one inlet fluidly coupled to at least one feed stream, at least one filter membrane fluidly coupled to the at least one inlet to receive feed water from the at least one feed stream, at least one pump to generate a pressure to displace the feed water from the at least one feed stream into the at least one filter membrane and produce an output permeate stream, and a controller configured to cause a first driving signal to be provided to the at least one pump to cause the generated pressure to produce the output permeate stream at a recovery rate that is substantially equal to a first target recovery rate during a first period of time, the first target recovery rate being greater than a maximum non-scaling recovery rate for the at least one filter membrane and less than 100%.

Example 42 includes the features of Example 41, wherein the controller is further configured to cause a second driving signal to be provided to the at least one pump to cause the generated pressure to produce the output permeate stream at a recovery rate substantially equal to a second target recovery rate during a second period of time.

Example 43 includes the features of Example 42, wherein the second target recovery rate is equal to or less than a maximum non-scaling recovery rate for the at least one filter.

Example 44 includes the features of Example 42, wherein the second target recovery rate is greater than the maximum non-scaling recovery rate for the at least one filter membrane.

Example 45 includes the features of Example 42, wherein the second target recovery rate is greater than the maximum non-scaling recovery rate for the at least one filter membrane and the first target recovery rate.

Example 46 includes the features of Example 42, wherein the second driving signal is configured to cause at least a partial flush of the at least one filter membrane.

Example 47 includes the features of Example 46, wherein the second target recovery rate is equal to zero such that all of the feed water of the at least one feed stream is output as reject.

Example 48 includes the features of Example 46, wherein the second target recovery rate is less than or equal to a maximum non-scaling recovery rate for the at least one filter membrane during a portion of the second period of time and greater than the maximum non-scaling recovery rate for a portion of the second period of time.

Example 49 includes the features of Example 46, wherein the second target recovery rate is greater than 0% and less than the maximum non-scaling recovery rate to cause a partial flush of the at least one filter membrane.

Example 50 includes the features of Example 42, wherein the second target recovery rate is between 96-100% such that a ratio of the received feed water to output permeate stream by volume is between 0.96 and 1.0 during the second period of time.

Example 51 includes the features of Example 42, further comprising at least one bleed valve fluidly coupled to the at least one filter membrane to output a first predetermined portion of the feed water of the at least one feed stream as reject water during the second period of time.

Example 52 includes the features of Example 51, wherein the second target recovery rate is equal to 100%, and wherein the controller is configured to cause the at least one bleed valve to close such that the first predetermined portion of feed water output as reject water is zero percent during the second period of time.

Example 53 includes the features of example 51, wherein the second target recovery rate is 100% such that 0% of the at least one feed stream is output as reject water during the second period of time.

Example 54 includes the features of Example 51, wherein the second period of time occurs prior to or after the first period of time based on a predetermined sequence of filter operations stored in a memory.

Example 55 includes the features of any one of Examples 42-54, wherein the second driving signal is further configured to cause one or a plurality of antiscalant doses to be introduced into the at least one filter membrane at a predetermined moment during the second period of time.

Example 56 includes the features of Example 55, wherein the predetermined moment delineates the second period of time into a first induction period occurring prior to the predetermined moment and a second induction period occurring after the predetermined moment at which antiscalant is introduced, the first induction period being a period of time operating before scaling and/or fouling of the at least one filter membrane occurs, the second induction period being a period of time measured from when the antiscalant is introduced to when scaling and/or fouling of the at least one filter membrane occurs.

Example 57 includes the features of any one of Examples 42-56, wherein the controller is further configured to cause a third driving signal to be provided to the at least one pump to cause at least a partial flush during a third period of time, the third period of time subsequent to the second period of time.

Example 58 includes the features of Example 57, wherein the third driving signal is configured to cause the at least one pump to generate a pressure to produce the output permeate stream at a recovery rate that is substantially equal to a third target recovery rate during the third period of time, the third target recovery rate being different than the first and second target recovery rates.

Example 59 includes the features of any one of Examples 57-58, wherein the third target recovery rate is between 0% and 80% during the third period of time to cause at least a partial flush of the at least one filter membrane.

Example 60 includes the features of any one of Examples 57-58, wherein the third recovery rate is substantially 0% to cause a full flush of the at least one filter membrane.

Example 61 includes the features of any one of Examples 42-60, wherein the second period of time is subsequent to the first period of time, and wherein causing the second driving signal to be provided during the second period of time occurs without causing an intervening full flush of the at least one filter membrane between the first and second periods of time.

Example 62 includes the features of Example 42, wherein the second driving signal is configured to cause pressure generated by the at least one pump to increase to an amount exceeding osmotic pressure of the at least one filter membrane such that over the second period of time pressure increases by at least 10 psi per minute, the second period of time being at least two (2) minutes.

Example 63 includes the features of Example 42, wherein the second driving signal is configured to cause the at least one pump to generate a substantially constant pressure such that over the second period of time the substantially constant pressure increases by a maximum of 10 pounds per square inch (psi) per hour, the second period of time being at least 6 hours.

Example 64 includes the features of any one of Examples 41-63, wherein the first driving signal is configured to cause pressure generated by the at least one pump to increase to an amount exceeding osmotic pressure of the at least one filter membrane such that over the first period of time pressure increases by at least 10 psi per minute, the first period of time being at least two (2) minutes.

Example 65 includes the features of anyone of Examples 41-63, wherein the first driving signal is configured to cause the at least one pump to generate a substantially constant pressure such that over the first period of time the substantially constant pressure increases by a maximum of 10 pounds per square inch (psi) per hour, the first period of time being at least 6 hours.

Example 66 includes the features of anyone of Examples 41-65, further comprising at least one bleed valve fluidly coupled to the at least one filter membrane to output a second predetermined portion of feed water of the at least one feed stream as reject water during the first period of time.

Example 67 includes the features of Example 66, wherein the first target recovery rate is less than or equal to 98%, the first predetermined portion of feed water being at least 2%, and wherein the controller is configured to cause the at least one bleed valve to output the first predetermined portion of feed water of the at least one feed stream to be output as reject water during the first period of time.

Example 68 includes the features of any one of Examples 41-67, wherein the controller is further configured to cause one or a plurality of antiscalant doses to be introduced into the at least one filter membrane at a predetermined moment during the first period of time.

Example 69 includes the features of Example 68, wherein the predetermined moment delineates the first period of time into a first induction period occurring prior to the predetermined moment and a second induction period occurring after the predetermined moment at which antiscalant is introduced, the first induction period being a period of time operating before scaling and/or fouling of the at least one filter membrane occurs, the second induction period being a period of time measured from when the antiscalant is introduced to when scaling and/or fouling of the at least one filter membrane occurs.

Example 70 includes the features of Example 69, wherein causing the first driving signal to be provided to the at least one pump further comprises causing the at least one pump to monotonically increase pressure beyond osmotic pressure of the at least one filter membrane from the predetermined moment the antiscalant is introduced to maintain the first target recovery rate during at least a portion of the second induction period.

Example 71 includes the features of any one of Examples 41-70, wherein the at least one filter membrane comprises at least one high-pressure filter membrane with a pressure casing capable of withstanding at least 90 bar of pressure.

Example 72 includes the features of any one of Examples 41-71, wherein the at least one filter membrane comprises at least first and second filter membranes, each of the first and second filter membranes providing at least a portion of first and second filter stages, respectively.

Example 73 includes the features of Example 72, further comprising a filter valve arrangement to switchably fluidly couple the first and/or second filter membranes to the at least one feed stream.

Example 74 includes the features of Example 73, wherein the controller is further configured to cause the filter valve arrangement to switchably fluidly couple the first and/or second filter membranes to the at least one feed stream during the first and/or second periods of time.

Example 75 includes the features of any one of Examples 41-74, wherein the at least one inlet fluidly couples to a bleed of a filter system such that the at least one feed stream comprises concentrate from the filter system.

Example 76 includes the features of any one of Examples 41-74, wherein the wherein the at least one inlet fluidly couples to an outlet of a filter system such that the at least one feed stream comprises permeate output by the filter system.

Example 77 is a method for operating a filtration system, the filtration system having an inlet fluidly coupled to at least one feed stream, at least one filter membrane fluidly coupled to the inlet to receive feed water of the at least one feed stream, and at least one pump to generate a pressure to displace the feed water of the at least one feed stream into the at least one filter membrane and produce an output permeate stream, the method comprising causing a first driving signal to be provided to the at least one pump, the first driving signal to increase the generated pressure of the at least one pump to an amount exceeding osmotic pressure of the at least one filter membrane and maintain a target recovery during a first period of time, the target recovery exceeding a maximum non-scaling recovery rate and having an associated duration of time prior to when a maximum non-scaling recovery state is reached for the at least one filter membrane, detecting when the maximum non-scaling recovery state is reached for the at least one filter membrane during the first period of time, and in response to detecting the maximum non-scaling recovery state is reached, causing one or a plurality of antiscalant doses to be introduced into the at least one filter membrane to increase an amount of time between when the maximum non-scaling recovery state is reached and when scaling and/or fouling of the at least one filter membrane occurs.

Example 78 is a method for operating a batch reverse osmosis (RO) filtration system, the batch RO filtration system having an inlet fluidly coupled to at least one feed stream, at least one filter membrane fluidly coupled to the inlet to receive feed water of the at least one feed stream, and at least one pump to generate a pressure to displace the feed water of the at least one feed into the at least one filter membrane and produce an output permeate stream, the method comprising causing a first driving signal to be provided to the at least one pump to cause output of the output permeate stream at substantially a target recovery rate during a first period of time, the target recovery rate being greater than a maximum non-scaling recovery rate for the at least one filter membrane, and the first driving signal to increase the generated pressure of the at least one pump to an amount exceeding osmotic pressure of the at least one filter membrane to maintain output of the output permeate stream at substantially the target recovery, and causing one or a plurality of antiscalant doses to be introduced into the at least one filter membrane at a predetermined moment during the first period of time.

Example 79 includes the features of Example 78, wherein the predetermined moment delineates the first period of time into a first induction period occurring prior to the predetermined moment and a second induction period occurring after the predetermined moment at which the one or plurality of antiscalant doses are introduced, the first induction period being a period of time operating before scaling and/or fouling occurs, the second induction period being a period of time measured from when the one or plurality of antiscalant doses are introduced to when scaling and/or fouling occurs.

Example 80 is a non-transitory computer-readable medium having a plurality of instructions stored thereon cause a method in accordance with Example 77 to be executed. Example 81 is a non-transitory computer-readable medium having a plurality of instructions stored thereon cause a method in accordance with any one of Examples 78-79 to be executed.

Example 82 is a non-transitory computer-readable medium having a plurality of instructions stored thereon cause a method in accordance with any one of Examples 1-40 to be executed.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus and/or system may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A filter system comprising:
   at least one inlet fluidly coupled to at least one feed stream;
   at least one filter membrane fluidly coupled to the at least one inlet to receive feed water from the at least one feed stream;
   at least one pump configured to generate a pressure to displace the feed water from the at least one feed stream into the at least one filter membrane and produce an output permeate stream; and
   a controller configured to:
     cause a first driving signal to be provided to the at least one pump to cause the generated pressure at the at least one filter membrane that exceeds an osmotic pressure associated with the at least one filter membrane and substantially maintain a first target recovery rate, the first target recovery rate being greater than a maximum non-scaling recovery rate for the at least one filter membrane and having an associated duration of time prior to when a pre-antiscalant maximum non-scaling recovery state is reached for the at least one filter membrane;
     determine when the pre-antiscalant maximum non-scaling recovery state is reached for the filter membrane; and
     in response to determining the pre-antiscalant maximum non-scaling recovery state is reached, cause one or a plurality of antiscalant doses to be provided to the filter membrane to increase an amount of time between when a post-antiscalant maximum non-scaling recovery state is reached and when subsequent scaling and/or fouling of the filter membrane occurs.

2. The filter system of claim 1, wherein causing the first driving signal to be provided to the at least one pump further comprises causing the at least one pump to monotonically increase pressure beyond osmotic pressure associated with the at least one filter membrane after the antiscalant is introduced to maintain the first target recovery rate during at least a portion of a second induction period.

3. The filter system of claim 1, wherein the at least one filter membrane comprises at least one high-pressure filter membrane with a pressure casing capable of withstanding at least 90 bar of pressure.

4. The filter system of claim 1, wherein the at least one filter membrane comprises at least first and second filter membranes, each of the first and second filter membranes providing at least a portion of first and second filter stages, respectively.

5. The filter system of claim 4, further comprising a filter valve arrangement to switchably fluidly couple the first and/or second filter membranes to the at least one feed stream.

6. The filter system of claim 1, wherein the at least one inlet fluidly couples to a bleed of a second filter system such that the at least one feed stream comprises concentrate from the second filter system.

7. The filter system of claim 1, wherein the wherein the at least one inlet fluidly couples to an outlet of a second filter system such that the at least one feed stream comprises permeate output by the second filter system.

8. The filtration system of claim 1, wherein the controller is further configured to detect that the pre-antiscalant maximum non-scaling recovery state has been reached based on a quality measurement of the output permeate stream.

9. The filtration system of claim 1, wherein the controller is further configured to detect the pre-antiscalant maximum non-scaling recovery state prior to reaching the maximum non-scaling recovery state.

10. The filtration system of claim 9, wherein the controller is further configured to detect the pre-antiscalant maximum non-scaling recovery state based on a constant duration of time.

11. The filtration system of claim 9, wherein the controller is further configured to detect the pre-antiscalant maximum non-scaling recovery state based on a concentration of antiscalant within the at least one feed stream.

12. The filtration system of claim 9, wherein the controller further comprises a first induction period and a second induction period, the second induction period occurring after the first induction period, the first induction period ending when the pre-antiscalant maximum non-scaling recovery state is reached and the second induction period extending from when the one or plurality of antiscalant doses are provided to the filter membrane to when the post-antiscalant maximum non-scaling recovery state is reached.

13. The filtration system of claim 12, wherein the second induction period is equal to or longer than the first induction period.

14. The filtration system of claim 12, wherein the second induction period has an overall duration that is at least half an overall duration of the first induction period.

15. The filtration system of claim 1, wherein the controller is further configured to cause the at least one pump to exert a pressure of 90-120 bar on the filter membrane.

16. The filtration system of claim 1, wherein the target recovery rate is 100% or the target recovery rate is less than 100% and greater than the maximum non-scaling recovery rate of the filter membrane.

* * * * *